Figure 1:
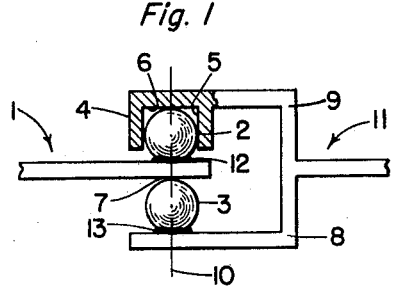

April 12, 1966   G. A. COOK ET AL   3,245,707
PIVOTAL COUPLING FOR INSTRUMENT LINKAGE
Filed Nov. 6, 1963

GARRETT A. COOK
NATHANIEL B. NICHOLS
INVENTORS

United States Patent Office 3,245,707
Patented Apr. 12, 1966

3,245,707
PIVOTAL COUPLING FOR INSTRUMENT
LINKAGE
Garrett A. Cook, Perinton, N.Y., and Nathaniel B. Nichols, San Bernardino, Calif., assignors to Taylor Instrument Companies, Rochester, N.Y., a corporation of New York
Filed Nov. 6, 1963, Ser. No. 321,788
3 Claims. (Cl. 287—101)

This invention relates to pivotal couplings for levers, particularly levers forming bars of a bar linkage such as is used to transmit the motion output of a condition responsive device to a pointer, a motion detecting means, a control element, or the like, to the end that said motion is portrayed on a scale, or is converted to some quantity such as an electrical signal, a pressure, and so on, which ultimately actuates some useful device such as an indicator, recorder or controller. For example, in the patent to K. L. Tate et al., No. 2,361,885, issued October 31, 1944, the motion output of a Bourdon tube 7 is reflected, variously, by position of a pen arm 59, the control action of a valve V and the spacing between a baffle 11 and a nozzle 12, and the like, the rotary motion of the tube 7 being converted into these varied effects, directly or indirectly, via a four-bar linkage, the three movable bars of which are a "take-off 8," a link 9 and a means 10. The first and last of said movable bars each constitute a lever pivoted at one end to a fixed point, in the one case, the center of rotation of Bourdon tube 7 and, in the other case, the axis of deflection of pen arm 59. Link 9, on the other hand, constitutes a lever pivoted at each end to a free end of the other levers, the arrangement being that such levers deflect substantially parallel to or in a common plane which is substantially normal to the various pivoting axes.

Since Bourdon tubes and many other kinds of condition responsive elements are in the main low-power motor elements, it is important to minimize the loading thereof. Thus, the linkage operated by tube 7 should be low in friction and inertia. Again, the linkage should transmit the tube motion with a certain amount of precision and consistency. With all this, the linkage nevertheless should be sturdy, simple, compact, easy to manufacture, tolerant of misalignment of the parts thereof, easy to adjust, and so on.

Conditions such as these are, in many respects, in obvious conflict, particularly as regards the pivotal coupling between levers in the linkage, and it is in fact the primary object of our invention to provide a pivotal coupling, the characteristics of which are in accord with the foregoing specifications. Other objects of the invention will appear in the course of describing, infra, the several forms of our invention.

Figure 2:
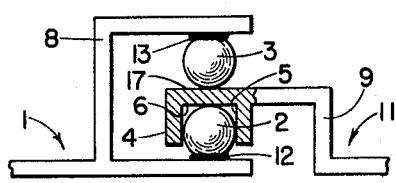
Figure 3:
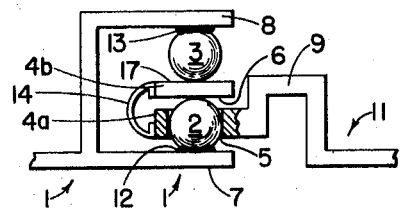
Figure 4:
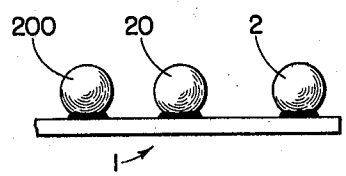
Figure 5:
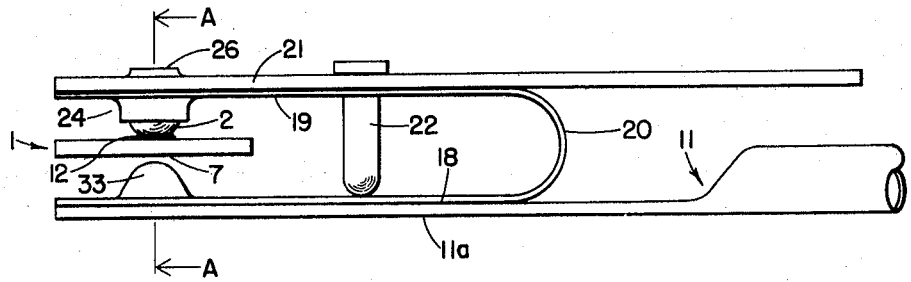
Figure 6:
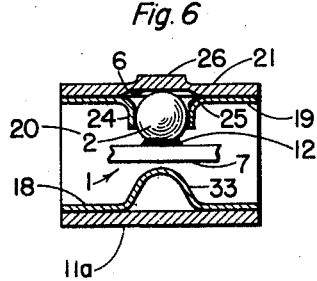
Figure 7:
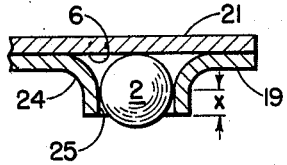

In the drawings:
FIGURE 1 illustrates one form of pivotal coupling according to the invention;
FIGURE 2 illustrates a second form of pivotal coupling according to the invention;
FIGURE 3 illustrates a third form of pivotal coupling according to the invention;
FIGURE 4 illustrates a detail of a lever such as may be used in a pivotal coupling according to the invention;
FIGURES 5 and 6 are views of a fourth form of pivotal coupling according to the invention, FIGURE 6 being a partial section on the line A—A of FIGURE 5; and
FIGURE 7 illustrates a detail of a pivotal coupling according to the invention.

FIGURE 1 illustrates our novel lever coupling in connection with levers 1 and 11 of a bar linkage of, say, the character described in the Tate et al. patent. Thus, the lever 11 may correspond to either of means 10 and take-off 8, and lever 1, accordingly, to link 9, or vice versa. Consider dashed line 10, FIGURE 1, therefore, to be the axis of a pivotal coupling between the next-adjacent ends of levers 1 and 11, so that the plane or planes of deflection of said levers would be transverse to the plane of the drawing, and the deflection of either of said levers is about an axis spaced from line 10. It will be observed that the pivot axis of the coupling, upon deflection of the levers, will shift in or out, and/or left or right with respect to line 10, under the circumstances thus far contemplated. However, whether or not the pivot axis of the coupling thus shifts is not material.

In the case of the species of our invention shown in FIGURE 1, the basic elements of the pivotal coupling of levers 1 and 11 are the balls 2 and 3, and the cup 4. The inner cylindrical surface and the flat inner bottom of cup 4 form bearing surfaces 5 and 6, respectively, for ball 2. The flat underside of lever 1 forms a bearing surface 7 for ball 3. The end of lever 11 forks into arm-like portions 8 and 9 to which are respectively fixed ball 3 and cup 4, the diameter of ball 3 and the cylindrical axis of the inner cylindrical surface of cup 4 falling on the line 10. In order to portray the fact that balls 2 and 3 form fixed parts of levers 1 and 11, respectively, a weld 12 is shown as securing ball 2 to the upper side of lever 1, and a weld 13 is shown as securing ball 3 to the upper side of arm 8. As is evident from the showing, cup 4 forms a fixed part of lever 11.

The relative positions of the elements thus far described are shown to be such that the flat bearing surfaces 6 and 7 are normal to line 10, hence, the pivot axis of the coupling falls on line 10, insofar as the configuration illustrated is concerned. Hence, the points of contact of the balls 2 and 3 with bearing surfaces 6 and 7 also fall on said pivot axis, and, theoretically, ball 2 has line contact on a great circle thereof with the cylindrical bearing surface 5, such that said great circle is normal to and centered on the line 10. These two point contacts and the one line contact are the only restraints maintaining a pivotal coupling between levers 1 and 11, and, theoretically, they restrict levers 1 and 11, relative to one another, to deflection parallel to a plane normal to line 10 and to the plane of the drawing.

In practice, there is necessarily a certain amount of play in the coupling. Thus, the diameter of the cylindrical surface 5 must perforce be a little larger than the diameter of ball 2. Again, the arm 8 may be deflected downward and away from arm 9. As a result, the centers of balls 2 and 3, or one or the other thereof may become displaced from the theoretical pivot axis, or may become displaced along it. However, as long as the ball 2 is deeper in cup 4 than the radius of ball 2, friction in the coupling is always that of point and line contact and the levers may be substantially misaligned, so that though they may deflect in non-parallel planes, they do so about a stable pivot axis that is substantially the cylindrical axis of bearing surface 5. The pivot axis, due to play of ball 2 in cup 4, will naturally diverge slightly from such cylindrical axis. It will also be observed that in the ideal bearing friction would be that of rotating a great circle of ball 2, about its axis, with the points of said great circle in continuous contact with a corresponding concentric circle of points on bearing surface 5, whereas the point contacts on surfaces 6 and 7 would be those between coincident points rotating but not displacing relative to one another. If play be taken into account and tilting of the pivot axis of the coupling, in actuality a point on a great circle of ball 2 slides over a circular path on bearing surface 5, and points on an arc on the surface of either, or each, of balls 2 and 3, will actually traverse, in succession, contact with a flat bearing surface. However, since the use of the pivotal coupling of levers 1 and 11 does not contemplate considerable loading of the contacts between bearing surfaces, a high polish of balls 2 and 3, and a normally smooth finish of the other surfaces involved, (i.e., that resulting merely from routine finishing of the material involved into stock suitable for stamping, punching, and otherwise shaping into lever form) assure low bearing friction.

FIGURE 2 represents a modification of the form of coupling shown in FIGURE 1, which modification consists of incorporating arm 8 and ball 3 as effectively integral parts of lever 1, and using a flat upper surface 17 of arm 9 as a bearing surface for ball 3. The coupling of FIGURE 2 has the same properties as that of FIGURE 1.

FIGURE 3 illustrates a coupling like that of FIGURE 2 except that the cup 4 has been split into parts 4a and 4b. Part 4b is, so to speak, the bottom of the cup, and part 4a the cylindrical part thereof, the arrangement being as if an annular section had been removed from the cup, just below its flat bearing surface 6, and replaced by a C-spring 14 attached at one end to part 4a and at the other end to part 4b, in order to hold the said parts in fixed relation to each other. Evidently, arm 9 can be deflected up or down, in the plane of drawing, without much bearing force change resulting even though the parts of the coupling are dimensioned to have zero-play, for spring 14 will absorb some of the energy involved. If spring 14 is quite flexible and the spacing between parts 4a and 4b relatively large, the restraints required for a stable pivotal coupling will remain without much increase in bearing forces, despite relatively large misalignments of lever 11 with respect to the pivotal coupling.

Adjustment of the lengths of levers 1 and/or 11 may be provided for by means of a series of balls like ball 2. Thus, FIGURE 4 illustrates lever 1 with identical balls 2, 20, and 200. These balls are shown as variably-spaced, implying a shortening of the effective lever length in going from low-numbered balls to high-numbered balls, which variability is a convenience in that the effects of angularity in linkage is frequently such that to get a linear adjusting effect, the increments of lever-length change must vary from one adjustment steps to the next adjustment step.

Conveniently, the unseen end of lever 1 may be identical to the illustrated end of link 11, and/or the unseen end of the latter may be equipped as is the illustrated end of link 1 (either with one, or with a plurality of balls). However, the form of the unseen parts of levers 1 and 11 depends on their use. For example, in the Tate et al. patent, only link 9 would ordinarily be provided with balls at one end and the illustrated end of lever 11 for its other end.

The illustrated pivotal coupling, as thus far described, is characterized by such simplicity of structure, as to be manufacturable on a routine assembly line basis, as there is no need for individual attention in the way of refining each pivotal coupling member, despite numerous variations in the practical realizations of the parts of the various coupling species. However, we have devised a practicable form of our inventive coupling having advantages not apparent from the idealized couplings illustrated in FIGURES 1, 2 and 3. This species of the invention, which accords in principle with the species of FIGURE 1, is shown in FIGURES 5 and 6. In this case, the arms 18 and 19 of a U-shaped spring 20 correspond to arm 8 and 9, respectively, FIGURE 1. Arm 18 is fastened to an extension 11a of lever 11, as by a few spot welds (not shown), and an elongated plate 21 is secured to arm 19 in similar fashion. As the normal state of spring 20 is to have the free ends of its arms pressing against each other, a pin 22 is provided to spread arms 18 and 19 into the position of substantial parallelism shown, pin 22 being fixed at its upper end to plate 21 and arm 19, with its rounded lower end abutting, but not being fixed to, the upper side of arm 18. Thus, the spring 20 maintains its arms in substantially the positions shown even when not assembled as part of a pivotal coupling.

The spread produced by pin 22 should be more than that which would be caused by the bearing elements, when levers 1 and 11 are assembled together. Hence, as FIGURES 5 and 6 suggest, substantial clearance may exist, both as between ball 2 and surface 6 and/or as between surface 7 and the next-adjacent structure thereunder.

A circular extrusion 24 represents cup 4, in that the interior periphery of the extrusion presents a bearing surface 25 corresponding to cylindrical bearing surface 5. Extrusion 24 is created by what is essentially a matter of punching a small circular hole through arm 19, and then forcing a tool therethrough to enlarge the said hole and to extrude the material around said hole into a sort of cylindrical wall or socket of the form indicated by FIGURES 5, 6 and 7 at 24. When the plate 21 is secured to arm 18 in the position shown, the under surface of plate 21 over the hole in arm 19 furnishes the flat bearing surface 6 presented in FIGURE 1 as the bottom of the interior of cup 4. If necessary, plate 21 may be dimpled so as to place bearing surface 6 above the plane of the lower surface of plate 21, whereby to create the protrusion 26 in the material of plate 21. This expedient is advantageous if it is difficult or inconvenient to create sufficient depth in extrusion 24. Thus, the dimple depth plus the extrusion depth may together provide the effective cup depth, if the material of arm 19 is not of such character as to allow forming an extrusion of regular, smooth inside surface free of breaks and other defects.

Ball 3 of the species of FIGURE 1 is represented by a protrusion 33, produced like extrusion 24, except to omit the preliminary step of punching a hole, so as to create a more or less spheroidal bearing member, the smooth rounded end of which can make point contact with the flat bearing surface 7 of lever 1.

A particular virtue of the coupling of FIGURES 5 and 6 is that pivotal action thereof depends on dimple 26 and protrusion 33 mainly to assure that a great circle of ball 2 is always in the socket formed by extrusion 24. Since the forces on the coupling due to lever deflection, are transverse to the pivotal axis of the coupling, the bearing contact of ball 2 and surface 25 tends to be self-maintaining, and unless the levers are sufficiently misaligned, with respect to the nominal pivot axis of the coupling, at most, only one of the flat bearing surfaces in the coupling will actually be contacted. Obviously, if one lever is tilted or twisted enough out of the horizontal orientation depicted in FIGURES 5 and 6, a bearing contact will arise at each of flat surfaces 6 and 7. However, this is the extreme case and normally at most one of the surfaces 6 and 7 will be involved in a bearing contact. Moreover, since in use the coupling is commonly oriented s that line 10 is horizontal, the sole positively maintained bearing contact will be that of ball 2 against the side of its socket. That is, gravity and the push or pull of one of levers 1 and 11 on the other substantially continuously would provide bearing forces directed transverse to line 10. On the other hand, forces directed along the line 10 would be much smaller and even non-existent at times, hence, it results that friction involving bearing contact including surface 7 or surface 6 is practically non-existent.

If the coupling shown in FIGURE 1 were provided with the same order of vertical play, such as shown in FIGURES 6 and 7, neither surface 6 nor surface 7 would be favored except as a result of misalignment, orientation with respect to gravity, etc., which may vary from case to case.

This is not to say that the triple bearing-contact arrangement is necessarily objectionable. It does mean, however, that as a practical matter, dimensional tolerances of the parts of the couplings of FIGURES 5 and 6, and of misalignment of the levers thereof, are theoretically considerably less rigid than those implied by playless configurations, such as FIGURES 1, 2 and 3 suggest. Nonetheless, the coupling of FIGURES 5 and 6 is at least as good as its idealized fellows as to the bearing friction aspect, and is substantially unaffected as to precision in its transmission of motion, by the generous quantity of vertical play depicted in FIGURES 5 and 6.

The most crucial tolerance involved in the coupling of FIGURES 5 and 6 involves the form of bearing surface 25 of socket 24. Due to the method of forming the socket, bearing surface 25 is, as the drawing suggests, in some degree non-cylindrical. However, the socket-forming process can be controlled so that the lower part of the cup is very nearly cylindrical, and the extent such control should be exerted ideally is portrayed in FIGURE 7, wherein ball 2 is shown inserted to maximum extent in its socket, i.e., contacting the bearing surface 6. Best results are obtained if, in the state of FIGURE 7, the play between ball 2 and surface 25 is just the minimum amount needed to allow ball 2 to rotate in socket 24. This minimum amount, again, is just the leeway required to insert the ball in the cup without resistance from the peripheral inner surface of the cup at its lower extremity. In other words, surface 25 should be a right cylinder from a point one radius of ball 2 from the bottom of the cup (i.e., bearing surface 6), to the lowermost termination of the surface 25 at the periphery of socket or wall 24. In FIGURE 7, the dimension $x$ denotes the above-defined right-cylindrical portion of the bearing surface 25.

Naturally, the trueness of the cylindrical portion of bearing surface 25 is attained only to a given tolerance, and the magnitude of this tolerance is determined by considerations of the use to which the coupling is to be put. In the present instance, use of the coupling as part of the indicating and control mechanism of an instrument such as that disclosed in the patent, supra, to Tate et al., usually dictates the highest degree of refinement in dimensioning and fitting the parts of the linkage. It is the particular advantage of the present invention that the degree such refinement is substantially solely a function of how nearly cylindrical bearing surface 25 is, in the region corresponding to dimension $x$.

For assembly and disassembly purposes, it suffices to pinch the right-hand end of plate 21 and the adjacent part of link 11 together, between finger and thumb, and engage or disengage ball 2 of lever 1 from socket 24. Both plate 21, extension 11a and lever 11 are stiff compared to the spring 20, and as the arms 18 and 19 of spring 20 are in effect integral with said extension and said plate, respectively, plate 21 and arm 19 are, in effect, flexibly pivoted to extension 11a by the bight of spring 20, which substantially confines such pivoting to an axis normal to the plane of FIGURE 5 and near the said bight.

It will be observed that the several bearing contacts are basically due to the juxtaposition of surfaces in pairs, one of which in some respect has a smaller radius of curvature at the place of contact than does the other. Thus, in FIGURE 1, supposing the diameter of ball 2 to be identical to that of cylindrical surface 5, nonetheless, the curvature of the longitudinal (i.e., along the drawing vertical) elements of the latter have a greater radius of curvature than the ball. Moreover, since the diameter of the surface 5 in practice is necessarily larger than the diameter of the ball, all the curvature radii of the horizontal elements of surface 5 are larger than those of the ball. This is true also in the case of FIGURES 5, 6 and 7, for the curvature of the inside surface of extrusion 24 is always away from that of the ball.

It is therefore evident that the contours of bearing surface pairs can be modified in various ways without altering the basic bearing relationships. For example, FIGURE 2 represents, in terms of FIGURE 5, providing both protrusion 33 and ball 2 on lever 1.

Further, ball 2, FIGURE 5, could be replaced by a cylindrical stud, and the inner surface of extrusion 24 allowed to be not quite cylindrical. In such case, such stud might provide a rounded upper end for point contact to flat surface 6, or might be flat if the next adjacent surface of plate 21 were convex instead of flat. However, it is to be observed that whereas a ball-like member can rotate in its socket freely in any diametral plane, a cylindrical member cannot so pivot except to the extent that the socket diameter is larger than that of the stud. Accordingly, a coupling having a cylindrical stud could tolerate a lesser amount of misalignment of the levers coupled than can the couplings shown.

The scale of FIGURE 5 is considerably exaggerated, though otherwise substantially in accordance with the proportions of an actual coupling of practical design. Likewise as to FIGURE 6, except that here the exaggeration is about double as the overall horizontal dimensions of parts 11a, 18, 19 and 21. In practice, ball 2 may be 1 millimeter in diameter, fitting socket 25 to a tolerance of 0.0010 inch, or less, the dimensions of the other parts being similarly reduced with respect to those of the drawings. The parts of the coupling are commonly metallic, of course, but quite light. For example, link 9 and take-off 8, such as disclosed by Tate et al., supra, incorporating our novel coupling, may weigh, altogether, less than 7 grams.

Having complied with 35 U.S.C. 112 in the matter of a written description of our invention, in further compliance with the statute, we have appended certain claims hereto, whereby to particularly point out and distinctly claim subject matter which we regard as our invention. However, we wish it to be understood that the said written description is exemplary rather than restrictive of our invention, for numerous modifications and uses of our novel lever coupling are possible which through not described herein, would fall within the scope and spirit of our invention as claimed hereinbelow.

We claim:

1. Linkage including a first lever and a second lever, each said lever having one end thereof joined to one end of the other so as to define a pivotal coupling, said coupling including a ball and a socket, said ball being received in said socket; one said lever being deflectible in a first plane, and the other said lever being deflectible so as to have a component of deflections in a second plane parallel to said first plane; said ball being fixed to the side of said first lever at said one end thereof, and said socket being fixed to the side of said second lever at the said one end thereof; the inside of said socket having the form of a surface of revolution, wherein in the axis of revolution lies transverse to the said planes, the said inside of said socket having such proportions as to receive said ball to the extent of a great circle thereof, and said ball having a great circle in said socket, said great circle lying in a plane normal to said axis of revolution; means preventing said ball from emerging from said socket so far as to allow said great circle to lie outside said socket; said first lever having a bearing surface on the side thereof opposite to its first said side, said second lever having a portion extending along its said end and spaced therefrom, said portion having a bearing surface on the side thereof facing the said first lever, the two last said bearing surfaces being constructed and arranged to make bearing contact with each other at a single point substantially on the said axis of revolution, whereby to define the aforesaid means; there also being provided means biasing said portion and the said one end of said lever together, and there being provided further means maintaining said portion and said one end of said second lever at substantially just sufficient distance to prevent said ball from shifting out of said socket so far that the said great circle lies outside said socket.

2. In combination, a two-armed U-shaped member, one arm thereof having a hole therein, a cylindrical wall integrally-joined to the periphery of said hole, and the cylindrical axis of said wall extending toward the other arm of said member; the other arm of said member having a bearing surface facing said hole; a lever having a ball fixed to one side thereof and a bearing surface on the other side thereof opposite said ball; said wall having a right cylindrical inside contour extending from the extremity of said wall toward said hole, the axis of said contour being said cylindrical axis; said lever being positioned between said arms with said ball received within the confines of said cylindrical wall to the extent of a great circle of said ball, said wall being so proportioned and arranged as to define a socket receiving said ball to the extent of said great circle of said ball, and the two said bearing surfaces being constructed and arranged to make point contact with each other substantially at a point on said cylindrical axis; said arms being spaced sufficiently near each other that said ball maintains a great circle thereof within the confines of said contour, the curvature of said right cylindrical inside contour approximating the curvature of said ball sufficiently closely as to provide a line contact between said contour and said great circle; and means providing a point contact bearing surface on said cylindrical axis and restraining said ball from being received so far into the confines of said cylindrical wall as to bring said lever into contact with the said extremity of said cylindrical wall.

3. The invention of claim 2 wherein said U-shaped member is a spring, the free state of which is such as to cause said arms to converge toward each other at their extremities, and pin means are provided between said arms for spreading said arms apart far enough to allow the lever to shift along said cylindrical axis, but not so far as to permit the said great circle to escape the confines of said cylindrical contour.

References Cited by the Examiner
UNITED STATES PATENTS

| | | | |
|---|---|---|---|
| 1,623,844 | 4/1927 | Kogstrom. | |
| 1,623,845 | 4/1927 | Kogstrom. | |
| 1,868,891 | 7/1932 | Faudi. | |
| 2,235,976 | 3/1941 | Best | 287—101 |
| 2,281,098 | 4/1942 | Hennessy | 74—579 |
| 2,561,969 | 7/1951 | Bowditch | 287—89 |
| 2,784,601 | 3/1957 | Booth | 287—101 X |

EDWARD C. ALLEN, *Primary Examiner.*

I. B. TALTON, C. B. FAGAN, D. W. AROLA,
*Assistant Examiners.*